(12) United States Patent  (10) Patent No.: US 10,591,708 B2
Cheng et al.  (45) Date of Patent: Mar. 17, 2020

(54) SLIT ILLUMINATION DEVICE AND MICROSCOPE SYSTEM WITH THE SAME

(71) Applicant: Medimaging Integrated Solution, Inc., Hsinchu (TW)

(72) Inventors: Chu-Ming Cheng, Hsinchu (TW); Long-Sheng Liao, Hsinchu (TW); Chi-Yuan Kang, Hsinchu (TW); Ming-Hsien Hsieh, Hsinchu (TW)

(73) Assignee: MEDIMAGING INTEGRATED SOLUTION, INC., Hsinchu (TW)

( * ) Notice: Subject to any disclaimer, the term of this patent is extended or adjusted under 35 U.S.C. 154(b) by 146 days.

(21) Appl. No.: 15/718,405

(22) Filed: Sep. 28, 2017

(65) Prior Publication Data

US 2018/0095260 A1  Apr. 5, 2018

(30) Foreign Application Priority Data

Oct. 4, 2016 (TW) .............................. 105132000 A

(51) Int. Cl.
*G02B 21/36* (2006.01)
*G02B 21/06* (2006.01)
(Continued)

(52) U.S. Cl.
CPC .............. *G02B 21/06* (2013.01); *G02B 5/005* (2013.01); *G02B 5/20* (2013.01); *G02B 21/0008* (2013.01); *G02B 21/361* (2013.01); *G02B 21/368* (2013.01)

(58) Field of Classification Search
CPC ................ G02B 19/00; G02B 19/0004; G02B 19/0009; G02B 19/0014; G02B 19/0028; G02B 19/0033; G02B 19/0047; G02B 19/0052; G02B 19/0061; G02B 19/0066; G02B 19/0076; G02B 19/0085; G02B 21/00; G02B 21/0004; G02B 21/0012; G02B 21/0032; G02B 21/0028; G02B 21/06; G02B 21/08; G02B 21/082; G02B 21/36; G02B 21/361; G02B 21/362
(Continued)

(56) References Cited

U.S. PATENT DOCUMENTS 3,833,283 A * 9/1974 Stankewitz ............ G02B 21/08
  359/388
4,353,618 A   10/1982 Hagner et al.
(Continued)

*Primary Examiner* — Arnel C Lavarias
(74) *Attorney, Agent, or Firm* — Muncy, Geissler, Olds & Lowe, PC

(57) ABSTRACT

A slit illumination device includes a first light-emitting element, a first diaphragm and a projection lens group. The first light-emitting element generates a primary illumination light. The first diaphragm has at least one opening and is disposed on a light exit side of the first light-emitting element, wherein the opening is an elongate shaped opening. The projection lens group is disposed on a light exit side of the first diaphragm, converging the primary illumination light and projecting it to a target object. A distance from the first diaphragm to the projection lens group is 1-2 times a focal length of the projection lens group on a light entrance side. The foregoing slit illumination device has advantages of simple structure, small size, and longer depth of field. A microscope system including the foregoing slit illumination device is also disclosed.

35 Claims, 4 Drawing Sheets

(51) Int. Cl.
*G02B 5/00* (2006.01)
*G02B 5/20* (2006.01)
*G02B 21/00* (2006.01)

(58) Field of Classification Search
USPC ....... 359/362, 363, 367, 368, 369, 379, 380,
359/384, 385, 388, 389, 390
See application file for complete search history.

(56) References Cited

U.S. PATENT DOCUMENTS

| | | | |
|---|---|---|---|
| 4,461,551 A | 7/1984 | Blaha | |
| 4,505,555 A * | 3/1985 | Piller | G02B 21/08 |
| | | | 359/388 |
| 6,392,797 B2 * | 5/2002 | Strahle | G02B 21/22 |
| | | | 351/221 |
| 8,000,004 B2 * | 8/2011 | Kuster | G02B 21/025 |
| | | | 359/368 |
| 2003/0025890 A1 | 2/2003 | Nishinaga | |
| 2011/0299036 A1 | 12/2011 | Goldenholz | |
| 2013/0278898 A1 | 10/2013 | Kato | |

\* cited by examiner

SLIT ILLUMINATION DEVICE AND MICROSCOPE SYSTEM WITH THE SAME

BACKGROUND OF THE INVENTION

1. Field of the Invention

The present invention relates to a slit illumination device and a microscope system with the same, particularly to a slit illumination device applicable to a handheld device and a microscope system with the same.

2. Description of the Prior Art

The microscope with slit illumination can project an elongate light beam on a target object to achieve high contrast in the edges of the illumination light beam. Via transmission (the Tyndall effect) or reflection of light, the user can observe whether there are cracks, relief, particles, or inhomogeneity in the surface or volume of a transparent or semi-transparent target object. The light source of slit illumination features high brightness. The slit illumination light beam is moved on the surface of the target object, whereby the user can observe the details of the target object via scattering or contrast of brightness and darkness. For example, the physician of ophthalmology uses the microscope with slit illumination to observe the eyelids, scleras, conjunctivae on the surface of eyes, the corneas and irises in the anterior chamber, the lenses in the posterior chamber; the physician may further use an additional gonioscope or handheld lens, together with slit illumination, to observe the retinas on the fundus or observe whether the iridocorneal drainage is blocked.

However, the conventional slit illumination module is too bulky to apply to handheld devices. Therefore, the existing microscopes with slit illumination are normally desktop systems. Accordingly, it has been a target the related manufacturers and research teams desire to achieve to reduce the volume of a slit illumination module and develop a handheld microscope with slit illumination.

SUMMARY OF THE INVENTION

The present invention provides a slit illumination device and a microscope system with the same, wherein the distance from the diaphragm having a slit pattern to the projection lens group is greater than the focal length of the projection lens group on the light entrance side and smaller than 2 times the focal length of the lens group on the light entrance side, whereby the volume of the slit illumination device is effectively reduced to such an extent that it is applicable to a handheld device.

In one embodiment, the slit illumination device of the present invention comprises a first light-emitting element, a first diaphragm, and a projection lens group. The first light-emitting element generates a primary illumination light. The first diaphragm has at least one opening, wherein the opening is an elongate-shaped opening. The first diaphragm is disposed on a light exit side of the first light-emitting element. The projection lens group is disposed on a light exit side of the first diaphragm, converging the primary illumination light and projecting the converged light to a target object. The distance from the first diaphragm to the projection lens group is greater than the focal length of the projection lens group on the light entrance side and smaller than 2 times the focal length of the projection lens group on the light entrance side.

In another embodiment, the microscope system of the present invention comprises a host machine and a slit illumination device. The host machine includes an image sensor and a display module. The image sensor captures a light coming from a target object to form an image. The display module is electrically connected with the image sensor, presenting the image captured by the image sensor. The slit illumination device includes a first light-emitting element, a first diaphragm, a projection lens group, and an imaging lens group. The first light-emitting element generates a primary illumination light. The first diaphragm has at least one opening, wherein the opening is an elongate-shaped opening. The first diaphragm is disposed on a light exit side of the first light-emitting element. The projection lens group is disposed on a light exit side of the first diaphragm, converging the primary illumination light and projecting the converged light to a target object. The distance from the first diaphragm to the projection lens group is greater than the focal length of the projection lens group on the light entrance side and smaller than 2 times the focal length of the projection lens group on the light entrance side. The imaging lens group converges the light coming from the target object to the image sensor. A first focus of the projection lens group on the light exit side coincides with a second focus of the imaging lens group on the light entrance side.

Below, embodiments are described in detail in cooperation with the attached drawings to make easily understood the objectives, technical contents, characteristics and accomplishments of the present invention.

DESCRIPTION OF THE PREFERRED EMBODIMENTS

Figure 1:
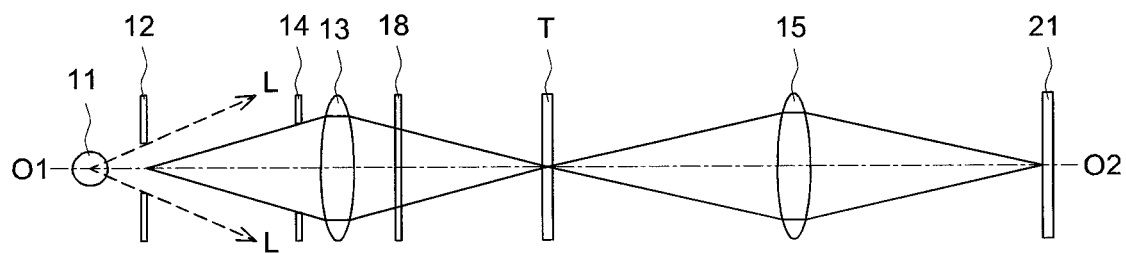
FIG. 1 is a diagram schematically showing a slit illumination device according to one embodiment of the present invention.

The present invention will be described in detail with embodiments and attached drawings below. However, these embodiments are only to exemplify the present invention but not to limit the scope of the present invention. In addition to the embodiments described in the specification, the present invention also applies to other embodiments. Further, any modification, variation, or substitution, which can be easily made by the persons skilled in that art according to the embodiment of the present invention, is to be also included within the scope of the present invention, which is based on the claims stated below. Although many special details are provided herein to make the readers more fully understand the present invention, the present invention can still be practiced under a condition that these special details are partially or completely omitted. Besides, the elements or steps, which are well known by the persons skilled in the art, are not described herein lest the present invention be limited unnecessarily. Similar or identical elements are denoted with similar or identical symbols in the drawings. It should be noted: the drawings are only to depict the present invention schematically but not to show the real dimensions or quantities of the present invention. Besides, matterless details are not necessarily depicted in the drawings to achieve conciseness of the drawings.

Refer to FIG. 1. In one embodiment, the slit illumination device of the present invention comprises a first light-emitting element 11, a first diaphragm 12 and a projection lens group 13. The first light-emitting element 11 generates a primary illumination light L. In one embodiment, the first light-emitting element 11 is a light-emitting diode or a laser diode. The first diaphragm 12 is disposed on a light exit side of the first light-emitting element 11. The first diaphragm 12 has at least one opening. In one embodiment, the opening of the first diaphragm 12 is an elongate-shaped opening, and the primary illumination light L passing the first diaphragm 12 is thus an elongate-sectioned light beam. It should be explained herein: an appropriately-packaged light-emitting diode or laser diode can limit the angle of light output; placing the light-emitting diode or laser diode close to the first diaphragm 12 can effectively utilize the output light of the light-emitting diode or laser diode by over 80%. In other words, no additional collector lens is needed to be arranged between the first light-emitting element 11 and the first diaphragm 12. Therefore, the number of elements and the volume of the device is reduced.

The projection lens group 13 is disposed on a light exit side of the first diaphragm 12, converging the primary illumination light L passing through the first diaphragm 12, and projecting the converged light to a target object T to form an elongate light spot on the surface of the target object T or generate an elongate-sectioned light beam inside the target object T. In one embodiment, the projection lens group 12 includes at least three lenses, and at least one of the three lenses is a cemented doublet lens or a cemented triplet lens. Generally, the target object T is disposed at the focus on the light exit side of the projection lens group 13, whereby the edges of the light spot or light beam have higher contrast. In one embodiment, the slit illumination device further comprises a second diaphragm 14. The second diaphragm 14 is disposed between the first diaphragm 12 and the projection lens group 13 for limiting the amount of the primary illumination light L incident on the projection lens group 13. The second diaphragm 14 can limit the stray light having greater incident angles from projecting to the projection lens group 12, whereby the contrast of the edges of the light spot or light beam can be further enhanced. It is easily understood: the second diaphragm may also be disposed among the plurality of lenses of the projection lens group 13 (not shown in the drawings).

It is easily understood: the slit illumination device needs to maintain higher contrast in the observation field, particularly in the depth direction. Therefore, a longer depth of field of the projection light beam can provide better performance. In order to elongate the depth of field, the projection light beam of the slit illumination device should be a magnified real image. In one embodiment, the distance from the first diaphragm 12 to the projection lens group 13 is greater than the focal length of the projection lens group 13 on the light entrance side and smaller than 2 times the focal length of the projection lens group 13 on the light entrance side. It is preferred: the distance from the first diaphragm 12 to the projection lens group 13 is greater than 1.3 times the focal length of the projection lens group 13 on the light entrance side and smaller than 1.5 times the focal length of the projection lens group 13 on the light entrance side. In one embodiment, the distance from the first diaphragm 12 to the projection lens group 13 is greater than the focal length of the projection lens group 13 on the light entrance side of the projection lens group 13 and smaller than 1.22 times the focal length of the projection lens group 13 on the light entrance side so that the depth of field of the projection light beam covers the thickness of the cornea of human beings.

As the projection light beam is a magnified real image, the size of the opening of the first diaphragm 12 is decreased correspondingly so that the size of the projection light beam can match the size that the observer needs to operate the microscope system. In one embodiment, the first diaphragm 12 is a substrate having an opening. The substrate may be a silicon substrate, a metal substrate, a ceramic substrate, a glass substrate, or a substrate made of an appropriate material. The opening may be formed in the substrate via steps of exposure, development, etching, etc. In one embodiment, the first diaphragm 12 has a plurality of openings; the openings may be elongate or circular holes, which respectively have different widths, so as to meet the requirement of operation or the habit of the observer.

Figure 3:
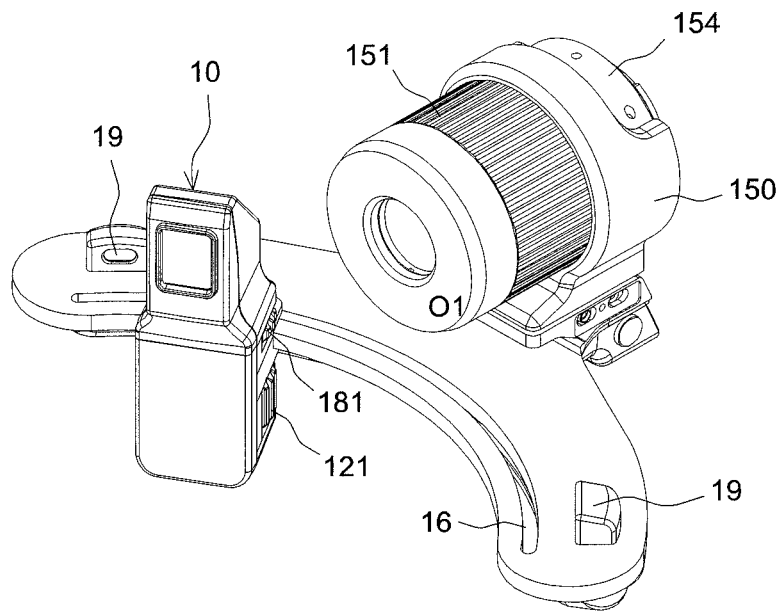
FIG. 3 is a perspective view schematically showing a slit illumination device according to one embodiment of the present invention.

In one embodiment, the first diaphragm 12 is a rotary disc-like structure, whereby the plurality of openings is disposed on the light exit side of the first light-emitting element 11 in a shiftable way. Refer to FIG. 3. In one embodiment, the first light-emitting element 11, the first diaphragm 12, and the projection lens group 13 are disposed inside a casing 10; via turning a first adjusting knob 121, the first diaphragm 12 is rotated to switch different sizes of openings to face the first light-emitting element 11. As the conventional slit illumination device varies the width of the slit via adjusting the spacing between two blades, it has complicated structure and bulky volume. The slit illumination device of the present invention can switch the openings of different widths via merely rotating the first diaphragm 12, having simpler structure and smaller volume.

Figure 4:
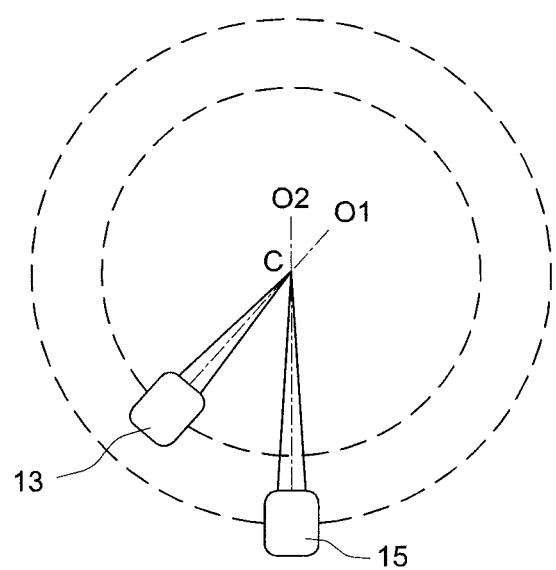
FIG. 4 is a diagram schematically showing the relationship of a projection lens group and an imaging lens group of a slit illumination device according to one embodiment of the present invention.

Refer to FIG. 1 again. In one embodiment, the slit illumination device of the present invention further comprises an imaging lens group 15 for converging the light coming from the target object T to an image sensor 21. The light coming from the target object T may be the primary illumination light L reflected by the target object T, the primary illumination light L penetrating the target object T, or the fluorescent light generated by that the primary illumination light L excites the target object T. In the embodiment shown in FIG. 1, the optical axis O1 of the projection lens group 13 coincides with the optical axis O2 of the imaging lens group 15. However, the optical axis O1 of the projection lens group 13 and the optical axis O2 of the imaging lens group 15 usually have an included angle therebetween, as shown in FIG. 4.

Refer to FIG. 3 again. In one embodiment, the slit illumination device of the present invention further comprises an arc-shaped slide rail 16. The first light-emitting element 11, the first diaphragm 12 and the projection lens group 13 can slide along the arc-shaped slide rail 16. In one embodiment, the imaging lens group 15 is disposed inside a casing 150, and the casing 150 is fixedly connected with the arc-shaped slide rail 16. Because the first light-emitting element 11, the first diaphragm 12 and the projection lens group 13 are disposed inside the casing 10, moving the casing 10 can adjust the included angle between the optical axis O1 of the projection lens group 13 and the optical axis O2 of the imaging lens group 15 to favor the user observing the target object T.

It should be noted: a first focus of the projection lens group 13 on the light exit side is positioned at a circle center C of the arc-shaped slide rail 16. Therefore, no matter which position of the arc-shaped slide rail the casing 10 is moved to, the first focus of the projection lens group 13 on the light exit side is always at the circle center C of the arc-shaped slide rail 16. It is easily understood: in order to acquire definite images, a second focus of the imaging lens group 15 on the light entrance side is also positioned at the circle center C of the arc-shaped slide rail 16. In other words, the projection lens group 13 and the imaging lens group 15 are maintained on a confocal plane with the focus at the circle center C of the arc-shaped slide rail 16, as shown in FIG. 4. Therefore, placing the target object T at the circle center C of the arc-shaped slide rail 16 can acquire the optimized slit illumination and the best images.

In one embodiment, the slit illumination device of the present invention further comprises at least one second light-emitting element 19. The second light-emitting element 19 is disposed in at least one of two ends of the arc-shaped slide rail 16. In the embodiment shown in FIG. 3, two second light-emitting elements 19 are respectively disposed in two ends of the arc-shaped slide rail 16. For example, the second light-emitting element 19 is disposed in such a way that the second light-emitting element 19 and the imaging lens group 15 have an included angle of 45 degrees with respect to the circle center C. While the dynamic range of the image sensor 21 is limited, the second light-emitting element 19 may be triggered to generate an auxiliary illumination light to compensate the gray-level performance in the dark area of the image. In one embodiment, at least one of the first light-emitting element 11 and the second light-emitting element 19 may output light in a constant lighting mode or a flashing mode. The constant lighting mode outputs light of lower brightness, used in observing the target object T. The flashing mode outputs light of higher brightness in a shorter period of time (less than 250 ms), meeting the requirement of photographing. The flashing mode may be applied to high dynamic range (HDR) imaging and high-speed shutter.

Figure 2:
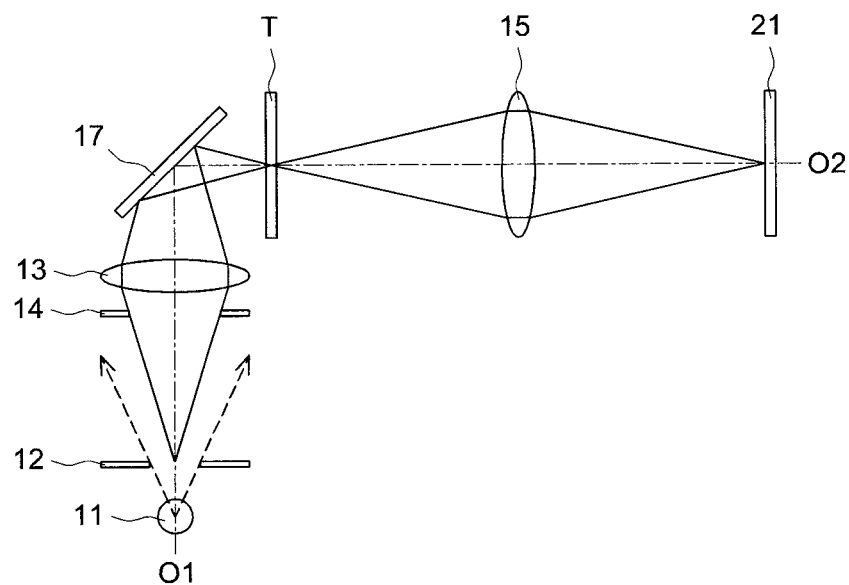
FIG. 2 is a diagram schematically showing a slit illumination device according to another embodiment of the present invention.

Refer to FIG. 2. In one embodiment, the slit illumination device of the present invention further comprises a reflective element 17. The reflective element 17 is disposed on the light exit side of the projection lens group 13, deflecting the optical path from the projection lens group 13 to the target object T and increasing the design flexibility of the slit illumination device. For example, the reflective element 17 can make the optical path, which is from the first light-emitting element 11 to the reflective element 17, vertical to the optical axis O2 of the imaging lens group 15. In other words, it can avoid the mutual interference between the imaging lens group 15 and the first light-emitting element 11, the first diaphragm 12, and the projection lens group 13. Therefore, the elements can be disposed more compactly, as shown in FIG. 3. Thus is reduced the volume of the slit illumination device of the present invention.

Refer to FIG. 1 again. In one embodiment, the slit illumination device of the present invention further comprises a filter 18. The filter 18 is disposed in an optical path from the first light-emitting element 11 to the target object T. For example, the filter 18 is disposed between the first light-emitting element 11 and the first diaphragm 12, or between the first diaphragm 12 and the projection lens group 13, or between the projection lens group 13 and the target object T, as shown in FIG. 1. The filter 18 allows the primary illumination light L having a specified range of wavelengths to pass. The filters 18 of different colors are adopted for different applications. For example, the filter 18 of blue color is used to observe fluorescence; the filter 18 of green color is used to enhance contrast of images. In one embodiment, the slit illumination device of the present invention comprises a plurality of filters 18, which are installed in the optical path from the first light-emitting element 11 to the target object T in a shiftable way. For example, the plurality of filters is disposed in a rotary-disc structure; via turning a second adjusting knob 181 (as shown in FIG. 3), the rotary disc is rotated to switch the filters 18 able to filter out different wavelengths to the optical path from the first light-emitting element 11 to the target object T.

Figure 5A:
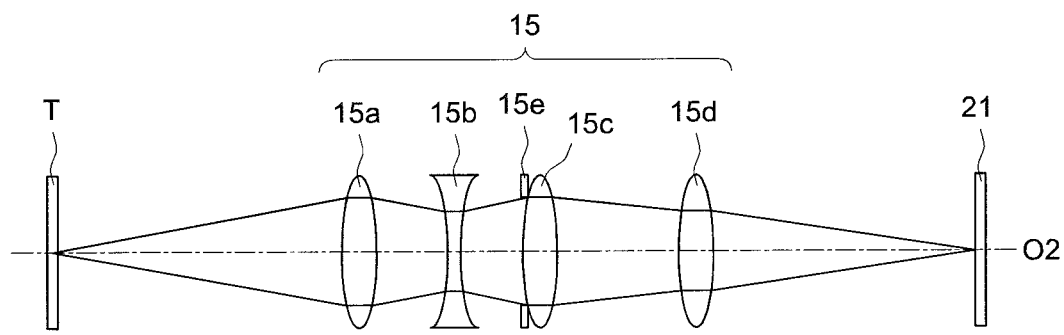
FIG. 5a and FIG. 5b are diagrams schematically showing a varifocal imaging lens group of a slit illumination device according to one embodiment of the present invention.
Figure 5B:
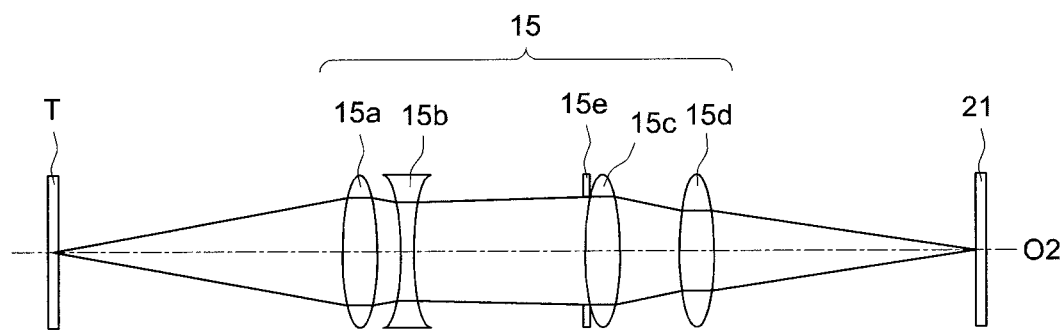

In one embodiment, the imaging lens group 15 is a varifocal lens group. Refer to FIG. 5a and FIG. 5b. The imaging lens group 15 includes a first lens 15a, a second lens 15b, a third lens 15c, and a fourth lens 15d, which are arranged from the target object T to the image sensor 21 in sequence. The effective focal lengths of the first lens 15a, the third lens 15c and the fourth lens 15d are positive. The effective focal length of the second lens 15b is negative. In one embodiment, the imaging lens group 15 further includes a third diaphragm 15e. The third diaphragm 15e is disposed between the second lens 15b and the third lens 15c and near the third lens 15c. While the focal length is adjusted, in order to fix the distance between the imaging lens group 15 and the target object T, only the second lens 15b, the third lens 15c and the third diaphragm 15e are moved with the first lens 15a and the fourth lens 15d functioning as a compensation lens maintained fixed, wherein the third diaphragm 15e is moved together with the third lens 15c. In one embodiment, turning a third adjusting knob 151 (as shown in FIG. 3) can rotate a cam ring to change the distance between the second lens 15b and the third lens 15c, whereby the focal length is varied. For example, the lens configuration of the telescopic end of the imaging lens group 15 is shown in FIG. 5a, and the lens configuration of the wide-angle end of the imaging lens group 15 is shown in FIG. 5b.

Figure 6:
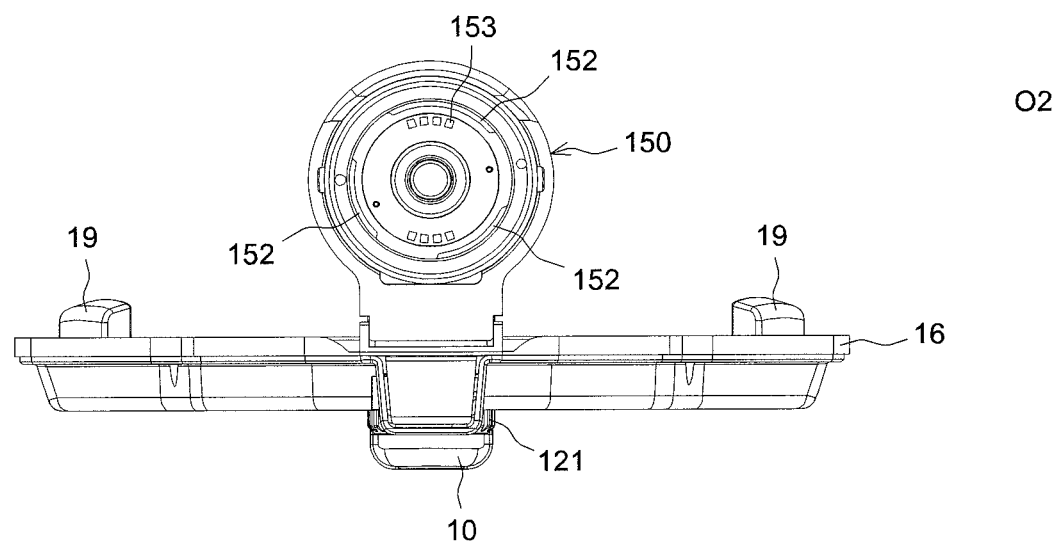
FIG. 6 is a rear view schematically showing a slit illumination device according to one embodiment of the present invention.
Figure 7:
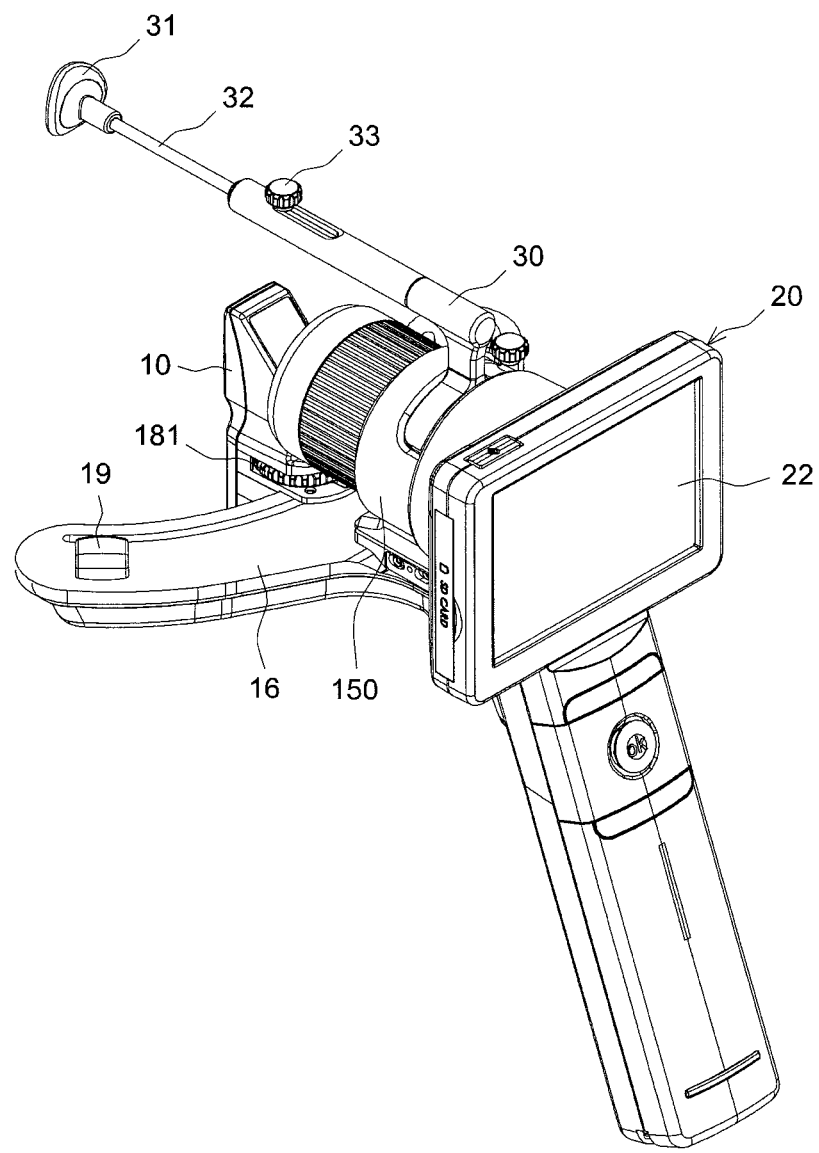
FIG. 7 is a perspective view schematically showing a microscope system according to one embodiment of the present invention.

Refer to FIG. 6. In one embodiment, the imaging lens group 15 includes at least one connection structure 152. The connection structure 152 is disposed on a light exit side of the imaging lens group 15. Refer to FIG. 7. Via the connection structure 152, the slit illumination device of the present invention can be replaceably joined to a host machine 20. It is easily understood: the slit illumination device of the present invention comprises a plurality of electric contacts 153. While the slit illumination device is joined to the host machine 20, the electric contacts 153 enable the slit illumination device to electrically connect with the host machine 20. Through the electric contacts 153, the host machine 20 can supply electric power and control signals to the first light-emitting element 11 and the second light-emitting element 19. According to the abovementioned structure, the host machine 20 can be engaged with different optical lens modules to observe different target objects T. The abovementioned different optical lens modules may be an ophthalmofundoscope lens module, an otoscope lens module, a dermoscope lens module, a photoplethysmography lens scope, a conchoscope lens module, a laryngoscope lens module, and an endoscope lens module.

Refer to FIG. 7. In one embodiment, the slit illumination device of the present invention further comprises a prop element 30. In one embodiment, the prop element 30 is connected with the casing 150 containing the imaging lens group 15. For example, the casing 150 includes a connection seat 154, and the prop element 30 is installed in the connection seat 154. In operation, the prop element 30 props against an appropriate position to limit the distance between the imaging lens group 15 and the target object T, whereby to enhance the stability of operation. For example, while the cornea of a human being is observed, the prop element 30 props against the forehead of a testee through a prop pad 31, whereby a given distance is kept between the imaging lens group 15 and the cornea of the testee. In one embodiment, the length of the prop element 30 is adjustable. For example, the prop element 30 includes a link rod 32 and a locking member 33. The link rod 32 is connected with the prop pad 31 and moveable along the direction of the optical axis of the imaging lens group 15. After the link rod 32 is adjusted to an appropriate length, the locking member 33 locks the link rod 32. According to the abovementioned structure, the distance between the imaging lens group 15 and the target object T is varied via adjusting the length of the link rod 32 to observe the testees respectively having eye sockets of different depths.

Refer to FIG. 7 again. In one embodiment, the microscope system of the present invention comprises a host machine 20 and a slit illumination device. The detailed structure of the slit illumination device has been described above and will not repeat herein. The host machine 20 includes an image sensor 21 (as shown in FIG. 1) and a display module 22. Through the imaging lens group 15, the image sensor 21 captures a light coming from the target object T to form an image. The display module 22 is electrically connected with the image sensor 21 and presents the images captured by the image sensor 21. In one embodiment, the host machine 20 has a profile of a handheld device, whereby the observer can easily hold the microscope system of the present invention. It is easily understood: the host machine 20 also includes other necessary or unnecessary elements, such as a processing unit, a memory module, a touch control module, a wired/wireless communication module, a memory socket, a battery module, etc. The abovementioned elements are not the features of the present invention but can be realized with the existing elements. Therefore, they will not repeat herein.

In conclusion, the present invention proposes a slit illumination device and a microscope system with the same, wherein the distance from the slit pattern-containing diaphragm to the projection lens group is 1-2 times the focal length of the projection lens group on the light entrance side, whereby the light passing the slit pattern is magnified and projected onto the target object, wherefore is acquired a projection light beam having longer depth of field, and wherefore is compacted the configuration of the light-emitting element and the projection lens group. The slit illumination device of the present invention is also characterized in that the illumination light source is moved along an arc-shaped slide rail and that the focuses of the projection lens group and imaging lens group are maintained at the circle center of the arc-shaped slide rail. Thus, the present invention is exempted from using the L-shaped brace of the conventional slit illumination device. Therefore, the present invention can effectively reduce the volume of a slit illumination device and is applicable to handheld devices.

What is claimed is:
1. A slit illumination device, comprising:
  a first light-emitting element generating a primary illumination light;
  a first diaphragm having at least one opening and disposed on a light exit side of the first light-emitting element, wherein the opening is an elongate opening; and
  a projection lens group disposed on a light exit side of the first diaphragm, converging the primary illumination light, and projecting the primary illumination light to a target object,
  wherein a distance from the first diaphragm to the projection lens group is greater than a focal length of the projection lens group on a light entrance side and smaller than 2 times the focal length of the projection lens group on the light entrance side.

2. The slit illumination device according to claim 1, wherein the distance from the first diaphragm to the projection lens group is greater than the focal length of the projection lens group on the light entrance side and smaller than 1.5 times the focal length of the projection lens group on the light entrance side.

3. The slit illumination device according to claim 1, wherein the first diaphragm comprises a plurality of openings that are elongate openings or circular openings, which respectively have different widths, and wherein the plurality of openings is disposed on the light exit side of the first light-emitting element in a shiftable way.

4. The slit illumination device according to claim 1, wherein the first diaphragm comprises a substrate, and the opening is formed in the substrate.

5. The slit illumination device according to claim 1, further comprising:
  a second diaphragm disposed between the first diaphragm and the projection lens group or among the projection lens group for limiting an amount of the primary illumination light projected to the projection lens group.

6. The slit illumination device according to claim 1, further comprising:
  an arc-shaped slide rail, wherein the first light-emitting element, the first diaphragm and the projection lens group are moveably disposed on the arc-shaped slide rail, and wherein a first focus of the projection lens group is at a circle center of the arc-shaped slide rail.

7. The slit illumination device according to claim 6, further comprising:
  an imaging lens group converging a light coming from the target object to an image sensor, wherein a second focus of the imaging lens group is at the circle center of the arc-shaped slide rail.

8. The slit illumination device according to claim 7, wherein the imaging lens group is a varifocal lens group.

9. The slit illumination device according to claim 8, wherein the imaging lens group comprises a first lens, a second lens, a third diaphragm, a third lens, and a fourth lens; effective focal lengths of the first lens, the third lens and the fourth lens are positive; an effective focal length of the second lens is negative; the first lens and the fourth lens are immobile; the second lens, the third lens and the third diaphragm are moveable for adjusting a focal length of the imaging lens group; and the third diaphragm is moved together with the third lens.

10. The slit illumination device according to claim 7, wherein the imaging lens group comprises a connection structure, which is disposed on a light exit side of the imaging lens group and enables the slit illumination device to be replaceably joined to a host machine.

11. The slit illumination device according to claim 7, further comprising:

a prop element connected with the imaging lens group to limit a distance between the imaging lens group and the target object.

12. The slit illumination device according to claim 6 further comprising
at least one second light-emitting element disposed in at least one of two ends of the arc-shaped slide rail and generating an auxiliary illumination light.

13. The slit illumination device according to claim 12, wherein an output mode of at least one of the first light-emitting element and the second light-emitting element comprises at least one of a constant lighting mode and a flashing mode.

14. The slit illumination device according to claim 1, wherein the first light-emitting element comprises a light-emitting diode or a laser diode.

15. The slit illumination device according to claim 1, wherein the projection lens group comprises at least three lenses, and at least one of the at least three lens is a cemented lens.

16. The slit illumination device according to claim 1, further comprising:
a reflective element disposed on a light exit side of the projection lens group and deflecting an optical path from the projection lens group to the target object.

17. The slit illumination device according to claim 1, further comprising:
at least one filter disposed in an optical path from the first light-emitting element to the target object and allowing the primary illumination light having a specified range of wavelengths to pass.

18. The slit illumination device according to claim 17, wherein a plurality of filters is disposed in the optical path from the first light-emitting element to the target object in a shiftable way.

19. A microscope system, comprising:
a host machine including:
an image sensor capturing a light coming from a target object to form an image; and
a display module electrically connected with the image sensor to present the image captured by the image sensor; and
a slit illumination device including:
a first light-emitting element generating a primary illumination light;
a first diaphragm having at least one opening and disposed on a light exit side of the first light-emitting element, wherein the opening is an elongate opening; and
a projection lens group disposed on a light exit side of the first diaphragm, converging the primary illumination light, and projecting the primary illumination light to the target object, wherein a distance from the first diaphragm to the projection lens group is greater than a focal length of the projection lens group on a light entrance side and smaller than 2 times the focal length of the projection lens group on the light entrance side; and
an imaging lens group converging a light coming from the target object to the image sensor, wherein a first focus of the projection lens group coincides with a second focus of the imaging lens group.

20. The microscope system according to claim 19, wherein the distance from the first diaphragm to the projection lens group is greater than the focal length of the projection lens group on the light entrance side and smaller than 1.5 times the focal length of the projection lens group on the light entrance side.

21. The microscope system according to claim 19, wherein the first diaphragm has a plurality of openings that are elongate openings or circular openings, which respectively have different widths, and wherein the plurality of openings is disposed on the light exit side of the first light-emitting element in a shiftable way.

22. The microscope system according to claim 19, wherein the first diaphragm comprises a substrate, and the opening is formed in the substrate.

23. The microscope system according to claim 19, wherein the slit illumination device further comprises:
a second diaphragm disposed between the first diaphragm and the projection lens group or among the projection lens group for limiting an amount of the primary illumination light projected to the projection lens group.

24. The microscope system according to claim 19, wherein the slit illumination device further comprises:
an arc-shaped slide rail, wherein the first light-emitting element, the first diaphragm and the projection lens group are moveably disposed on the arc-shaped slide rail, and wherein a first focus of the projection lens group is at a circle center of the arc-shaped slide rail.

25. The microscope system according to claim 24, wherein the slit illumination device further comprises:
at least one second light-emitting element disposed in at least one of two ends of the arc-shaped slide rail and generating an auxiliary illumination light.

26. The microscope system according to claim 25, wherein an output mode of at least one of the first light-emitting element and the second light-emitting element comprises at least one of a constant lighting mode and a flashing mode.

27. The microscope system according to claim 19, wherein the imaging lens group is a varifocal lens group.

28. The microscope system according to claim 27, wherein the imaging lens group comprises a first lens, a second lens, a third diaphragm, a third lens, and a fourth lens; effective focal lengths of the first lens, the third lens and the fourth lens are positive; an effective focal length of the second lens is negative; the first lens and the fourth lens are immobile; the second lens, the third lens and the third diaphragm are moveable for adjusting a focal length of the imaging lens group; and the third diaphragm is moved together with the third lens.

29. The microscope system according to claim 19, wherein the imaging lens group comprises a connection structure, which is disposed on a light exit side of the imaging lens group and enables the slit illumination device to be replaceably joined to a host machine.

30. The microscope system according to claim 19, wherein the slit illumination device further comprises:
a prop element connected with the imaging lens group to limit a distance between the imaging lens group and the target object.

31. The microscope system according to claim 19, wherein the first light-emitting element comprises a light-emitting diode or a laser diode.

32. The microscope system according to claim 19, wherein the projection lens group comprises at least three lenses, and at least one of the at least three lens is a cemented lens.

33. The microscope system according to claim 19, wherein the slit illumination device further comprises:

a reflective element disposed on a light exit side of the projection lens group and deflecting an optical path from the projection lens group to the target object.

34. The microscope system according to claim 19, wherein the slit illumination device further comprises:
at least one filter disposed in an optical path from the first light-emitting element to the target object and allowing the primary illumination light having a specified range of wavelengths to pass.

35. The microscope system according to claim 34, wherein a plurality of filters is disposed in the optical path from the first light-emitting element to the target object in a shiftable way.

* * * * *